(12) United States Patent
Vojtila

(10) Patent No.: US 9,893,501 B2
(45) Date of Patent: Feb. 13, 2018

(54) TRANSPARENT WILDLIFE COVERS FOR HIGH VOLTAGE ELECTRICAL EQUIPMENT

(71) Applicant: MIDSUN GROUP, INC., Southington, CT (US)

(72) Inventor: Robert Vojtila, Southington, CT (US)

(73) Assignee: Midsun Group, Inc., Southington, CT (US)

( * ) Notice: Subject to any disclaimer, the term of this patent is extended or adjusted under 35 U.S.C. 154(b) by 0 days.

(21) Appl. No.: 15/356,997

(22) Filed: Nov. 21, 2016

(65) Prior Publication Data
US 2017/0149221 A1    May 25, 2017

Related U.S. Application Data

(60) Provisional application No. 62/258,629, filed on Nov. 23, 2015.

(51) Int. Cl.
| | |
|---|---|
| *H01B 7/00* | (2006.01) |
| *H02G 1/02* | (2006.01) |
| *H01B 17/26* | (2006.01) |
| *H02G 3/30* | (2006.01) |

(52) U.S. Cl.
CPC .............. *H02G 1/02* (2013.01); *H01B 17/265* (2013.01); *H02G 3/24* (2013.01)

(58) Field of Classification Search
CPC ........ H01B 17/26; H01B 19/00; H01B 17/00; H01B 17/005; H01B 17/56; H01B 17/583; H01B 17/265; H02B 1/306; H02B 1/26; H05K 5/03; H05K 5/02; H05K 5/00; Y10T 29/49229; H02G 7/00; H02G 1/02; H02G 3/24

USPC ........ 174/152 G, 153 G, 135, 152 R, 138 R, 174/139, 138 F, 137 R, 5 R, 14 BH; 361/232

See application file for complete search history.

(56) References Cited

U.S. PATENT DOCUMENTS 4,845,307 A * 7/1989 Cumming .............. H01B 17/58
                                                                174/138 F
5,682,015 A * 10/1997 Harben .................. H01B 17/00
                                                                174/138 R (Continued)

OTHER PUBLICATIONS

Wikipedia, UL 94 re The Standard for Safety of Flammability of Plastic Materials for Parts in Devices and Appliances testing; https://en.wikipedia.org/wiki/UL_94, visited Aug. 9, 2017.

*Primary Examiner* — Angel R Estrada
(74) *Attorney, Agent, or Firm* — Joseph R. Carvalko; Cara C. Morris

(57) ABSTRACT

The invention relates to a transparent silicone rubber cover for animal mitigation a one-piece pliable molded clamshell cover made from a ultraviolet stable non-conductive polymer to encapsulate an electrical bushing used as a conduit for an electrical lead, the lead attached to the bushing via a connector device and a plurality of spaced apart non-electrically conductive button-snaps and associated holes along a pair of flange on each side of the clamshell opening to secure the cover circumferentially around the bushing, and wherein a top portion of the cover contains a centrally located port that provides access for an electrical lead line to the bushing.

10 Claims, 3 Drawing Sheets

(56) References Cited

U.S. PATENT DOCUMENTS

| | | | | |
|---|---|---|---|---|
| 5,794,495 A * | 8/1998 | Anderson | H01B 17/00 |
| | | | 29/235 |
| 6,005,196 A * | 12/1999 | Spillyards | H01B 17/00 |
| | | | 174/138 F |
| 6,255,597 B1 * | 7/2001 | Bowling | H01B 17/00 |
| | | | 174/138 F |
| 6,291,774 B1 * | 9/2001 | Williams | H01B 17/00 |
| | | | 174/135 |
| 6,486,785 B1 * | 11/2002 | Hoth | H01B 17/00 |
| | | | 250/443.1 |
| 7,075,015 B1 * | 7/2006 | Rauckman | H02G 7/00 |
| | | | 174/135 |
| 7,301,096 B2 * | 11/2007 | Strong | H01B 17/00 |
| | | | 174/5 R |
| 7,622,668 B1 * | 11/2009 | Tollefson | H01B 17/00 |
| | | | 174/135 |
| 8,859,906 B2 * | 10/2014 | Hiller | H01B 17/00 |
| | | | 174/138 E |
| 8,957,314 B2 * | 2/2015 | Niles | H02G 7/00 |
| | | | 174/138 F |
| 9,036,861 B2 | 5/2015 | Chen et al. | |
| 9,646,743 B2 * | 5/2017 | Spencer | H01B 17/00 |

\* cited by examiner

TRANSPARENT WILDLIFE COVERS FOR HIGH VOLTAGE ELECTRICAL EQUIPMENT

FIELD OF THE INVENTION

This invention relates generally to high voltage equipment utilizing barriers and covers for animal mitigation and human safety.

BACKGROUND

Wildlife creates serious power disruptions when they short circuit high voltage power equipment, such as electrical switches, bus insulators and bushings. The damage usually disables the distribution and substation equipment used to supply electrical energy to communities. Solutions to prevent animals from approaching power equipment, such as the use of chemical pesticides, are expensive, not environmentally friendly, and must be repeatedly applied.

The high voltage electrical connectors and insulators typically use dielectric elements, which require monitoring to ascertain if they are properly functioning and the extent to which they may require maintenance. For example, a temperature reading of a bushing may anticipate electrical problems, such that a reading more than 5 degrees F. above the specified operating temperature of the equipment may indicate a loose connection, corroded, overloaded or unbalanced, requiring maintenance. In some cases, the oil levels that serve as insulators or coolants may be observed, and a low reading often requires maintenance as well. In both instances these observations necessitate the removal of any protective physical barriers or covers, which is time consuming and expensive.

U.S. Pat. No. 6,005,196 describes a cover for electrical bushings, but is opaque and must be removed to determine temperature or when maintenance is required.

U.S. Pat. No. 5,794,495 is a guard that allows infrared temperature readings, but creates an open configuration which is still accessible to wildlife.

U.S. Pat. No. 6,486,785 describes a barrier for electrical bushings, that allows a remotely determined temperature of the bushing, connector and electrical lead line, within an enclosure. The enclosure has two segmented halves hinged together along a rear vertical hinge line and locked together by a front latch. The generally cylindrical body has multiple closely spaced apart openings with an opening diameter of less than an inch. None of the prior art permits a maintenance person to inspect the entirety of the electrical bushings without either a removal of the barrier or cover or having to inspect the components through an opening in the cover itself.

What is needed is a cost-effective solution that allows maintenance inspections on electrical switches, bus insulators and bushings that are used for power distribution systems supplying electrical energy to communities, without removing the covers, also referred to as covers, or without having a cover with an opening to the outside, which allows for the penetration of water, as well as the environmental effects of such things as mold, combined with an enclosure that protects switches, bus insulators and bushings from wildlife.

SUMMARY OF THE INVENTION

This invention relates to a barrier to guard against wildlife contacting an electrically energized and an electrically grounded surface, protecting an associated electrical insulator from environmental elements, and allowing for inspections directly through the barrier from a distance, while completely insulating the internal components from the outside environment.

The invention more specifically relates to a transparent article for the inspection of high voltage equipment includes a one-piece molded clamshell pliable ultraviolet (UV) stable non-conductive silicone platinum cured cover for encapsulating an electrical bushing and an electrical lead, the cover including a sealable pair of flanges to secure the cover circumferentially around the bushing and the electrical lead, wherein the cover permits the inspection of the condition of the bushing and electrical lead.

In one embodiment the cover allows for the passage of infrared radiation through the transparent silicone rubber to permit one of visual or electronic inspection of the condition of the bushing and the electrical lead.

In another embodiment of the invention, a transparent silicone cover material is platinum cured silicone rubber cover for animal mitigation includes a one-piece pliable molded clamshell cover made from an ultraviolet stable non-conductive polymer; to encapsulate an electrical bushing used as a conduit for an electrical lead, the electrical lead attached to the bushing via a connector device; a plurality of spaced apart non-electrically conductive button-snaps and associated holes along a pair of flanges on each side of the clamshell opening, to secure the cover circumferentially around the bushing, and wherein a top portion of the cover contains a centrally located port that provides access for an electrical lead line to the bushing.

A transparent rubber barrier for human and animal safety comprising: a one-piece tapered clamshell cover molded from an ultraviolet stable non-conductive silicone polymer that encapsulates an electrical connector to a life threatening voltage, said transparency of the barrier allowing for visual inspection of the presence of the connection and the assessment of the state of the voltage; a sealable pair of flanges to secure the barrier, such that a bottom portion of the barrier surrounds the connector and wherein a top portion of the barrier contains a centrally located port that provides for an electrical lead line to the connector.

The present invention is also a method for employing a low cost enclosure for electrical connectors and bushings, which is easily mounted and provides for passage of infrared radiation through a transparent silicone rubber, to permit temperature readings on, and generally inspect the condition of the connectors and bushings.

In one embodiment the barrier is a transparent cover, constructed from a silicone rubber, that fits over the insulator, allowing workers to inspect the condition of the insulator from a distance.

In another embodiment the transparent cover is used in combination with an infrared temperature gun that determines the temperature of the insulator.

In another embodiment the transparent cover is used in combination with a device such as a telescope or binocular that can determine the oil level of the insulator dielectric.

In one embodiment a drone in combination with high voltage equipment, having a transparent cover provides a low-cost solution for power plant imaging and remote inspection to supplement visual inspections.

In one embodiment a drone having an on board Global Positioning System (GPS) allows the drone to locate the power station, collect information through the transparent cover, to identify structural defects and "wear-and-tear," such as insulator cracks or damage due to environmental factors.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts, and wherein.

DETAILED DESCRIPTION

Figure 1:
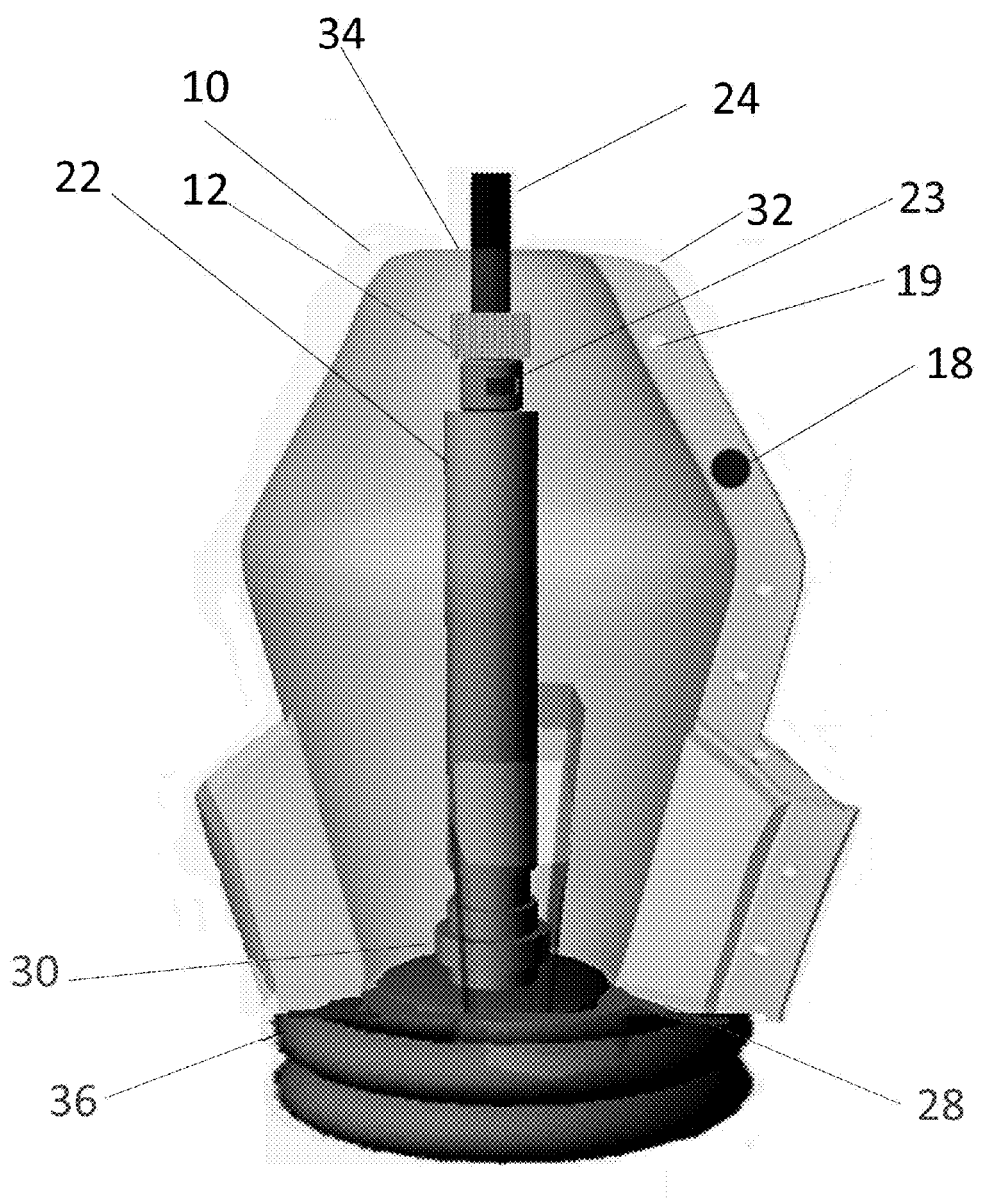
FIG. 1 shows a front perspective view of a transparent cover in accordance with an embodiment of the invention.

It is to be understood that the figures and descriptions of the present invention have been simplified to illustrate elements that are relevant for a clear understanding, while eliminating, for the purpose of clarity, many other elements, or geometric shapes, found in transparent covers or covers and the associated method of using covers to determine the condition of the insulator. Those of ordinary skill in the art may recognize that other elements and/or steps may be desirable in implementing the present invention. However, because such elements and steps are well known in the art, and because they do not facilitate a better understanding of the present invention, a discussion of such elements and steps is not provided herein. Throughout the following detailed description the same reference numerals refer to the same elements in all figures.

All silicone materials will yellow at some point in time, and one objective is to insure that the UV/Ozone from external sources, (e.g., sun or electrical high voltage equipment) will not attack the cover causing it to yellow and diminish the ability to see or measure the infrared radiation emanating there through. An objective of the transparent cover, over existing covers, is that it be improved by a polymer cure technology process, such as peroxide or platinum, as discussed below.

Peroxide cured parts maybe somewhat cloudy and the platinum has been found to be optically clearer, partly due to the peroxide catalyst coloring versus the platinum, which is a clear catalyst. Certain platinum cured technology has been developed in connection with the medical industry in mind, where clarity is an important feature. However medical tubing is not exposed to the environment as are animal mitigation covers. In one embodiment of the invention the silicone cover material is platinum cured, which appears clearer than the peroxide cured silicone cover.

Figure 2:
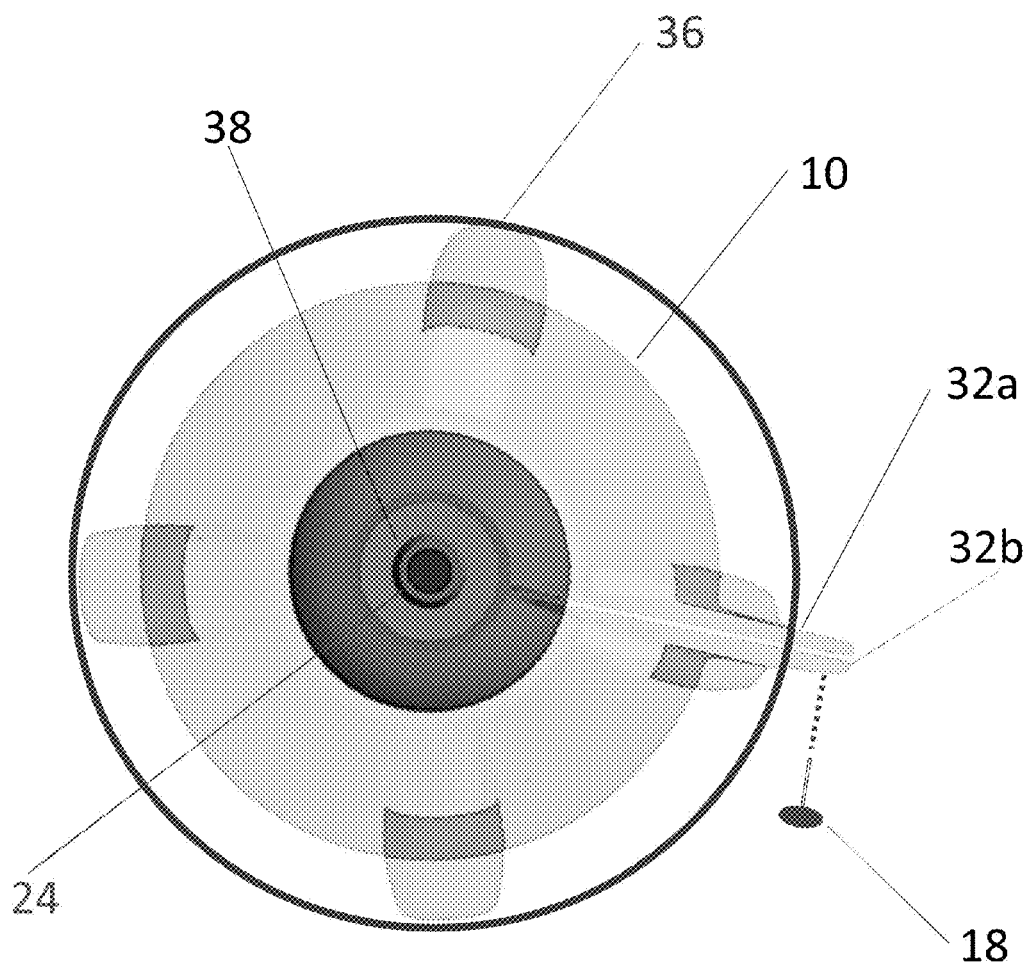
FIG. 2 shows a top plan view of a transparent cover in accordance with an embodiment of the invention.
Figure 3:
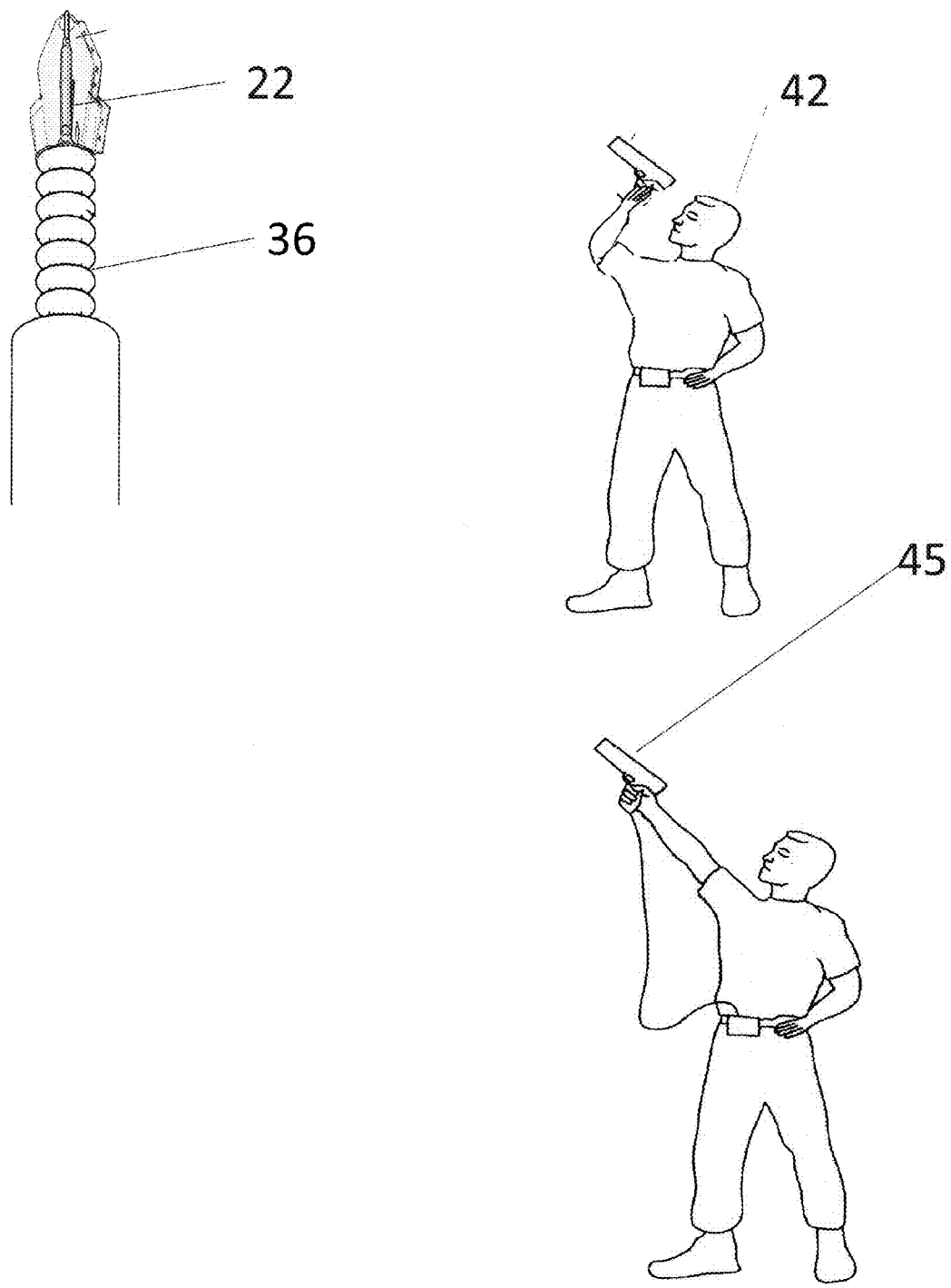
FIG. 3 shows a perspective view of a transparent cover and a maintenance worker holding an infrared detection system for determining the temperature of an electrical component in accordance with an embodiment of the invention.

Referring to FIGS. 1-3, the exemplary cover 10 is a one-piece pliable molded cover made from a UV stable non-conductive transparent silicone rubber. In one embodiment, the cover, encapsulates, shields or surrounds an electrical bushing 22, that is used as a conduit for an electrical lead 24. The electrical lead may be attached to the bushing via a connector device 12. The bushing 22 typically includes a sight glass 23 that displays the level of an oil that is used in connection with the operation of the insulator. A series of non-electrically conductive connectors 18, such as button-snaps (or male-female type connectors) and/or associated holes 19 through which one or more cable- or zip-ties may also be used to secure the cover, spaced apart along a pair of sealable flanges 32a, 32b (see FIG. 2), that includes a projecting flat rim or collar secures or closes the cover 10, such that a bottom portion 28 surrounds the circumferential structure of the bushing 22 lower portion 30. The sealable flanges may alternatively consist of a tongue and groove or a ridge along the length of the opening on one side of the cover and a corresponding groove on an opposing side of the cover. In an alternate embodiment, each side of the sealable flanges may have a groove or a ridge along the length into which a sealant may be applied such that when the two flange sides are compressed together, the sealant protects against water intrusion. Such techniques of securing pliable covers are well-known to those of ordinary skill in the mechanical arts.

As shown in FIG. 2, the cover 10 sits atop a ceramic insulator 36. A top portion 34 with a centrally located hole 38 provides an exit for the electrical lead line 24. Also as shown in FIG. 2 the cover 10 surrounds the electrical bushing and is secured using non-electrically conductive connectors such as button-snaps 18 and associated holes 19.

As shown in FIG. 3, one embodiment of the invention is a method for measuring one or more of the distance to the sight glass, thermal temperature of (the oil or equipment to determine maintenance needs), or oil level, with a device 45 such as a thermal temperature sensor or infrared (IR) detection equipment, such as infrared camera 45 at the cover 10. Since the cover is transparent, the device 45 measures one or more of the temperature generated by the electrical bushing 22 and the associate components such as connector 24 inside the cover 10. A reading more than 5 degrees F. above normal equipment operating temperature indicates a potential for an electrical component failure caused by a loose, corroded, overloaded or unbalanced connector 12 or lead line 24. Aiming the device 45 at a prior art cover or cover which is not transparent or have any openings will not provide a reliable reading as to the true temperature, since the line of sight or infrared radiation would be masked.

In yet another embodiment of the invention, an automatically launched device such as drone equipped with an infrared temperature device and/or a camera device, and/or heat seeking devices, detects and reports temperature or heat emanating from a bushing 22 and associated electrical components protected from the environment by the transparent cover as described herein, which permits such sensing and/or visibility. In one embodiment the drone includes a GPS that locates the position of the bushing 22, through either heat, or visual detection made possible through the transparent cover, or based upon a prior mapping, and proceeds to record and transmit the temperature of the bushings to a central site. The drone in combination with the transparent barrier provides a low-cost solution for power plant imaging and remote inspection to supplement visual inspections.

The above description has described the method steps embodying the invention. However, it will be within the skill of one having ordinary skill in the art to make modification without departing from the spirit and scope of the underlying inventive concept of this method. While the present invention has been described with reference to the illustrative embodiments, this description is not intended to be construed in a limiting sense. Various modifications of the illustrative embodiments, as well as other embodiments of the invention, will be apparent to those skilled in the art in reference to this description. It is expressly intended that all combinations of those elements that perform substantially the same function in substantially the same way to achieve the same results are within the scope of the invention. Substitutions of elements from one described embodiment to another are also fully intended and contemplated. It is therefore contemplated that the appended claims will cover any such modifications or embodiments as fall within the true scope of the invention.

I claim:

1. An apparatus for the human and animal safety inspection of high voltage equipment comprising: a transparent, one-piece molded clamshell pliable ultraviolet stable non-conductive platinum cured silicone cover for encapsulating an electrical bushing and an electrical lead, the cover including a sealable pair of flanges to secure the cover circumferentially around the bushing and the electrical lead, wherein the cover permits the inspection of the condition of the bushing and the electrical lead, said bushing further including an oil-filled sight glass to determine one of temperature of the oil or oil level.

2. The apparatus of claim 1 wherein the cover allows the passage of infrared radiation through the transparent silicone cover to permit one of visual or electronic inspection of the condition of the bushing and the electrical lead.

3. The apparatus of claim 1 wherein the sealable pair of flanges is one of (a) a plurality of non-conductive button-snaps spaced apart the opening of the clam shell, or (b) a tongue and groove, or (c) a ridge along the length of the opening on one side of the cover and a corresponding groove on an opposing side of the cover.

4. A transparent cover for animal safety mitigation comprising: a one-piece pliable molded clamshell cover made from an ultraviolet stable non-conductive cover material platinum cured silicone; to encapsulate an electrical bushing used as a conduit for an electrical lead, the electrical lead attached to the bushing via a connector device; a plurality of spaced apart non-electrically conductive button-snaps and associated holes along a pair of flange on each side of the clamshell opening, to secure the cover circumferentially around the bushing, and wherein a top portion of the cover contains a centrally located port that provides access for an electrical lead line to the bushing, said bushing further including an oil-filled sight glass to determine one of temperature of the oil or oil level.

5. A transparent rubber barrier for human and animal safety comprising: a one-piece tapered clamshell cover molded from a pliable ultraviolet stable non-conductive platinum cured silicone polymer that encapsulates an electrical connector to a life threatening voltage, said transparency of the barrier allowing for visual inspection of the presence of the connection and the assessment of the state of the voltage; a sealable pair of flanges to secure the barrier, such that a bottom portion of the barrier surrounds the connector and wherein a top portion of the barrier contains a centrally located port that provides for an electrical lead line to the connector.

6. The cover of claim 5 wherein the silicone cover material is peroxide cured.

7. The cover of claim 5 wherein the transparent barrier is used in combination with an infrared temperature gun that determines the temperature of the insulator.

8. The cover of claim 5 wherein the transparent barrier is used in combination with a device such as one of a telescope or binocular that can determine the oil level of the bushing dielectric.

9. The cover of claim 5 wherein a drone in combination with the transparent barrier provides a low-cost solution for power plant imaging and remote inspection to supplement visual inspections.

10. The cover of claim 5 wherein a drone having an on board Global Positioning System (GPS) allows the drone to locate the power station, collect information through the transparent barrier to identify structural defects and "wear-and-tear," such as insulator cracks or damage due to environmental factors.

* * * * *